(12) United States Patent
Ward

(10) Patent No.: US 7,727,420 B2
(45) Date of Patent: Jun. 1, 2010

(54) CORROSION INHIBITING COMPOSITIONS

(75) Inventor: Irl E. Ward, Bethlehem, PA (US)

(73) Assignee: PPT Research, Allentown, PA (US)

( * ) Notice: Subject to any disclaimer, the term of this patent is extended or adjusted under 35 U.S.C. 154(b) by 67 days.

(21) Appl. No.: 11/130,768

(22) Filed: May 17, 2005

(65) Prior Publication Data
US 2009/0176685 A1    Jul. 9, 2009

(51) Int. Cl.
*C23F 11/10* (2006.01)
(52) U.S. Cl. .................... 252/396; 510/365
(58) Field of Classification Search ............. 252/396; 510/365
See application file for complete search history.

(56) References Cited

U.S. PATENT DOCUMENTS

| | | | | |
|---|---|---|---|---|
| 3,965,027 A | * | 6/1976 | Boffardi et al. | 252/180 |
| 4,217,216 A | * | 8/1980 | Lipinski | 210/700 |
| 4,392,972 A | * | 7/1983 | Mohr et al. | 252/75 |
| 4,606,890 A | * | 8/1986 | Fisk | 422/15 |
| 4,681,686 A | * | 7/1987 | Richardson et al. | 210/699 |
| 4,963,631 A | * | 10/1990 | Randell | 526/240 |
| 5,073,299 A | * | 12/1991 | Cook | 252/389.23 |
| 5,229,030 A | * | 7/1993 | Clubley et al. | 252/389.23 |

* cited by examiner

*Primary Examiner*—Gregory E Webb
(74) *Attorney, Agent, or Firm*—John Lezdey

(57) ABSTRACT

Corrosion inhibiting composition for use in aqueous or semi-aqueous stripping, cleaning, abrasive lapping and abrasive slurry compositions that form 5, 6, 7, or 8-membered chelating rings with a base metal together with a film forming polymeric chelation agent. Optionally there is included an oxygen scavenger.

18 Claims, No Drawings

CORROSION INHIBITING COMPOSITIONS

The present invention relates to corrosion inhibiting compositions for metals and metal alloys in the presence of water, oxygen or high ionic activity aqueous or semi-aqueous solutions. More particularly, there is provided corrosion inhibiting compositions containing monomeric chelating agents which form 5-8 membered ring chelating structures with a base metal including iron and iron alloys, such as steel, together with a film forming polymeric chelating agent which are used with aqueous and/or organic solvents.

BACKGROUND OF THE INVENTION

Corrosion inhibitors are commonly found in cleaning and stripping compositions used in the semiconductor industries where various metals such as aluminum, aluminum alloys, titanium, titanium alloys, titanium/tungsten, tungsten, copper, etc are utilized.

The different functional classifications by which corrosion inhibitor compounds can be categorized are as follows:
1. Chelating agents
2. Reducing agents
3. Oxygen scavengers
4. Film forming agents
5. Oxidizing agents which form a protective film, typically of metal oxide.

None of the corrosion inhibitor types are effective for all mechanisms of corrosion or for all metal or metal alloys. Oxygen scavengers are not particularly effective at eliminating oxygen induced corrosion of iron or its alloys in the presence of an aqueous solution of high ionic character. Neither prior art corrosion inhibitors used in the semi-conductor industry that are chelating agents or oxygen scavengers are effective in preventing corrosion of iron or carbon steel in the presence of water, oxygen or high ionic activity aqueous or semi-aqueous solutions.

U.S. Pat. No. 3,996,147 to Settineri et al discloses the use of sulfonium corrosion inhibitors which inhibit corrosion of metal surfaces, particularly ferrous and cuprous metal surfaces in aqueous acid solutions alone or in combination with other chelating agents such as an aminocarboxylic acid, for example, ethylene diaminetetraacetic acid (EDTA).

U.S. Pat. No. 5,334,332 to Lee et al, which is herein incorporated by reference discloses chelating agents and solvent systems which can be used with the inhibitors of the present invention. The reference does not disclose a film forming polymeric chelating agent.

U.S. Pat. Nos. 5,707,947 and 5,753,601, which are herein incorporated by reference, disclose phenol derivatives that adsorb onto or absorb into the surface of neutral (zero valent) metals and/or chelation of their anions with the oxidized cationic metal surface which reduces the dissolution rate of the oxidized surface.

SUMMARY OF THE INVENTION

The present invention relates to corrosion inhibiting compositions and the methods for their use containing film forming polymeric chelating agents which form 5, 6, 7, or 8-membered ring structures with a transition metal, which is oxidizable to a single or multivalent stable state including surfaces of iron and iron alloys. The film forming polymeric chelating agents are neutralized to about neutral or caustic pH.

Optionally, there is included a monomeric chelating agent.

The ratio of monomeric chelating agent to film forming agent is about 5:1 to 1:5.

Advantageously, the neutralizing agent is a sterically hindered amine or a non-metal hydroxide. Such a sterically hindered amine can also be used in combinations with a metal hydroxide base to obtain the desired pH. Use of a metal hydroxide base alone will provide inferior corrosion protection from the composition of the invention.

Additionally, it is advantageous to include in the corrosion inhibiting compositions an effective oxygen scavenger.

It is a general object of the present invention to provide a corrosion inhibiting composition which can be used on a large variety of metal surfaces.

It is another object of the invention to provide a corrosion inhibiting composition containing chelating agents which form a 5, 6, 7, or 8-membered chelating rings with the atomic or surface metal elements or alloy.

It is yet another object of the invention to provide about neutral or alkaline cleaning, stripping and abrasive lapping compositions which contain corrosion inhibitors including a film forming chelating agent.

It is still another object of the invention to provide corrosion inhibitors for lapping, polishing (as in chemical mechanical polishing/planarization) and wire cutting systems that employ abrasive slurries and cleaners.

DESCRIPTION OF THE PREFERRED EMBODIMENTS

There is provided corrosion inhibiting compositions which contain a monomeric chelating agent in combination with a film forming polymeric chelating agent that forms 5-8 membered rings with the metal atoms or surface metal elements of a transition metal or alloy which is oxidizable to a single or multivalent stable state including but not limited to iron and iron alloy surfaces. The preferred film forming polymeric chelating agent is one which forms a stable chelating ring, preferably of 5, 6, or 7-elements or atoms (such elements will typically include, but not limited to the atom of the metal substrate, C, O, N and others). Examples of film forming polymeric chelating agents which can be used include:
1. Poly ortho-di or trihydroxyl, carboxy or sulfoxy aromatic compounds, for example novolacs, poly o-di or tricarboxylic acid styrenes, resoles, and
2. Polyacrylic acids and co-polymers thereof such as polyacrylic-co-maleic acid (PACM) which are miscible with water and compatible with many polar solvents.

The monomeric chelating agents include the known multi (ie; 1-3) hydroxy phenols, (ie; catechol, pyrogallol, 1, 2 or 1,8-di-hydroxy naphthalene, which form 5 or 6-membered rings, etc.) multi-functional aromatic acids and the multi-functional aliphatic carboxylic or amino acids, hemi mallitic acid and trimallitic acid and polymers and copolymers thereof. The above plus dianions of alpha or beta bifunctional aliphatic acids can chelate and form 6, 7, or 8-membered rings for example, malonic acid and EDTA.

The ratio of monomeric chelating agents to film forming agents is about 5:1 to 1:5.

Aromatic chelating agents include gallic acid, pyrogallol catechol, o-benzodicarboxylic acid, benzoic acid, ammonium benzoate, phthalic anhydride, mallitic acid, tetramethyl ammonium gallate, and derivatives thereof, and the like.

Other chelating agents glutaric acid which forms an 8-membered ring and compounds of the general formulas:

$$HO_2C-(CH_2)_n-CO_2H \qquad 1.$$

wherein n is 0-3

   2.

wherein n is 1-3

   3.

wherein n is 1-3

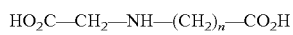   4.

wherein n is 0 or 1

   5.

wherein n is 1-4 and R is hydrogen, alkyl of 1-4 carbon atoms, alkylene of 1-4 carbon atoms, aryl or benzo.

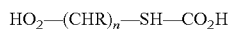   6.

wherein R is hydrogen or alkyl and n is 1-3

Multifunctional aliphatic or non aromatic cyclic chelating agents include malonic acid, EDTA, CDTA, imino diacetic acid, maleic acid, malic acid, D,L-maleic acid, cyclohexanl 1,2-dicarboxylic acid and the like, form stable 6, 7 or 8 membered rings with the base metals at or about neutral or caustic pH. The preferred monomeric chelating agent is malonic acid which is also neutralized in the same manner as the polymeric chelating film formor.

Although neutralization of the chelating agent can be performed with alkali or alkaline earth metal caustic such as barium, magnesium, sodium or potassium hydroxide, or an organic base, the strongest chelation occurs when the neutralizing base is a sterically hindered amine or a non-metal hydroxide such as triethanolamine (TEA) and tetramethylammonium hydroxide (TMAH) or other alkanolamines. In this manner, the counter positive ion of the neutralizing base is large and bulky, not allowing for the close proximity to the negatively charged polymer or monomeric agent. This means that the negative charge on the polymer or monomeric agent is more isolated from the positive counter ion and is more available for the formation of a strong chelation bond with the base metal. A preferred method of neutralization is to partially neutralize with an alkali metal caustic such as NaOH or KOH and then complete the neutralization with a sterically hindered amine, or substituted ammonium hydroxide.

To prevent the corrosion of iron and iron alloys, the combination of an effective film forming chelation compound and a strong monomer chelation compound provide an effective corrosion inhibitor system. However, further effectiveness can be achieved by the addition of an oxygen scavenger. Some chelating agents are also oxygen scavengers. The most common oxygen scavengers are nitrates, sulfites, and hydroquinone. The oxygen scavengers include tetramethylaminosulfite (TMAS), tetramethylaminonitrite, alkali metal sulfite including sodium sulfite, and potassium sulfite, alkali metal nitrite including sodium nitrite and potassium nitrite, ammonium sulfite, ammonium nitrite, and the like. Other $O_2$ scavengers known include ascorbic acid, multi-hydroxy aromatics such as catechol, pyrogallol, hydroquinone, a hydroxyl-N-heterocyclic such as 8-hydroxyquinoline and others. Most preferred is hydroquinone. The oxygen scavengers can be utilized in an amount of about 0.1 to 50% of the total inhibitor composition.

The corrosion inhibitors of the invention have been found to be particularly more advantageous in high ionic aqueous media than prior art corrosion inhibitors. They are especially more advantageous over previous inhibitors for iron and steel products. They are preferably used in compositions having a pH of 6.0 to 11.0.

The inhibitors of the invention can be formulated with aqueous and semi-aqueous organic solvent systems in an amount of about 0.25 to 10% by weight of composition, preferably about 0.5 to 5%. The solvents and various co-solvents and cleaning compositions in which the corrosion inhibitors may be used are seen, for example, in U.S. Pat. No. 5,334,332 to Lee, U.S. Pat. Nos. 4,395,479; 4,428,871; and 4,401,748 issued to Ward et al and U.S. Pat. No. 5,308,745 issued to Schwartzkopf, which are herein incorporated by reference. Preferred solvents in the patents include water solutions of tetramethylammonium hydroxide (TMAH), various pyrrolidinone compounds such as N-methylpyrrolidnone (NMP), gamma-butyrolactone (BLO), diethyleneglycol monoalkyl ether, alkanolamines including monoethanolamine, triethanolamine (TEA), 2-amino-2-ethoxyethanol, polar solvents including alkylene glycol, poly-alkylene glycols, ethylenediamine, alkyl and dialkyl aliphatic amides such as DMAC and the like.

A typical lapping or slurry composition comprises;
about 1-30% by weight of in situ formed aqueous or semi aqueous aluminum hydroxide,
about 1 to 30% by weight of salt compounds selected from the group consisting of sodium or potassium sulfate, tetramethylammonium sulfate, tetraethylammonium sulfate and alkali or alkaline earth metal sulfate,
about 0.25 to 10% by weight of a corrosion inhibitor comprising polyacrylic-co-maleic acid at a film forming average molecular weight of about 1500 or greater and malonic acid. The polyacrylic-co-maleic acid and malonic acid being present in a ratio of 5:1 to 1:5,
about 1-50% by weight of an abrasive material,
the remainder being water.
Optionally, an oxygen scavenger can be included.

The following Examples are illustrative of the invention and are not limited to the scope of the invention.

EXAMPLE 1

A corrosion inhibitor composition of the invention was prepared by admixing the following:

| Ingredient | Parts by Weight |
|---|---|
| Polyacrylic acid - co-maleic acid (PACM) (mols. Wt. 1500) | 1.00 |
| Malonic acid | 1.00 |
| Hydroquinone | 0.25 |

0.5 to 5% by weight of the corrosion inhibitors can be added to an aqueous abrasive slurry, lapping, stripping and cleaning composition that may include triethanolamine (TEA), which is also a neutralizing base, and dissolved salts create a high ionic strength aqueous mixture.

EXAMPLE 2

Tests were conducted measuring the effect of the corrosion inhibitor system visually and by optical microscopy without an oxygen scavenger using carbon steel. The compositions were prepared by partially neutralizing the corrosion inhibitor with 1.0N sodium hydroxide and then bringing the pH to 8.5 with TEA. One half of sample strips of spring carbon steel were suspended into the test media comprising a 15% salt solution of neutralized aluminum sulfate for six hours at ambient temperature. At the end of the time the test pieces were rinsed with D.I. water and blown dry with nitrogen. The results were as follows:

| % Aqueous Salt Solution | % Malonic | % PACM | % Commercial Ferrous C.I. | Neutralized to pH | Corrosion Results |
|---|---|---|---|---|---|
| 15 | 0.5 | 0.5 | | 8.5 | No Corrosion |
| 15 | 0.75 | 1.5 | | 8.5 | No Corrosion |
| 15 | 1 | 2 | | 8.5 | No Corrosion |
| 15 | 1.25 | 1.25 | | 8.5 | No Corrosion |
| 15 | 1.5 | 0.75 | | 8.5 | No Corrosion |
| 15 | — | — | DeCore BEPS 1-2% | 8.5 | Visual Surface Etching |
| 15 | — | — | Colacor-400 0.05-0.5% | ~-8.0 | Significant Surface Corrosion |
| 15 | — | — | DeCore-APCI-95 1-2% | ~-8.0 | Significant Surface Corrosion |
| 15 | — | — | DeCore-1MT 100LF 0.2-.05% | ~8.0 | Significant Surface Corrosion |
| 15 | — | — | DeTrope CA-100 1-2% | ~8.0 | Surface Corrosion Visual |

EXAMPLE 3

Stripping and cleaning compositions for photoresists were prepared as follows with the corrosion inhibitor of Example 1 and tested according to Example 2.

| Ingredient | Wt. % | Wt. % Corrosion Inhibitor | Corrosion on a Ferrous Steel Surface |
|---|---|---|---|
| 1. Triethanol amine | 90 | 1.5 | None |
| Water | 10 | | |
| 2. Triethanol amine | 30 | 1.5 | None |
| Water | 50 | | |
| Ethylene glycol Monoethyl ether | 20 | | |
| 3. Polyethylene glycol | 50 | 1.5 | None |
| Water | 50 | (neutralized w/NaOH) | |
| 4. N-methylpyrrolidinone | 45 | 1.5 | None |
| Water | 40 | | |
| Sulfolane | 15 | | |
| 5. Hydroxylamine (50% aq. solution) | 30 | 1.5 | None |
| 2-amino-2-ethoxyethanol | 20 | | |
| Water | 50 | | |
| 6. DMAc | 55 | 1.5 | None |
| MEA | 15 | | |
| Water | 30 | | |
| 7. Water | 70 | 1.5 | None |
| TEA | 10 | | |
| 50% H.A. aq. | 20 | | |

What is claimed is:

1. A corrosion inhibitor for use in an aqueous or semi-aqueous solvent system which consists of;
   a) a monomeric chelating agent selected from the group consisting of a multifunctional aromatic acid, multi-functional aromatic anhydride, multi-functional aliphatic acid, multi-functional aliphatic anhydride, aromatic or aliphatic amino acids, aromatic or aliphatic di or tri-amines and
   b) an acidic film forming polymeric chelating agent which forms a 5, 6, or 7-membered chelating ring with a metal surface of a transition metal which is oxidizable to a single or multivalent stable state, said corrosion inhibitor being neutralized or partially neutralized; whereby said corrosion inhibitor forms a 5-7 member chelating ring with said metal surface.

2. The corrosion inhibitor of claim 1 including an oxygen scavenger.

3. The corrosion inhibitor of claim 2 in which said oxygen scavenger is selected from the group consisting of 8-hydroxyquinoline, ascorbic acid, aliphatic alkanol amines, N,N-dialkyl hydroxylamine, hydroquinone, o-dihydroxy or o-trihydroxy substituted aromatic compounds, alkali metal sulfite, alkali metal nitrite and tetramethyl ammonium sulfite or nitrile.

4. The corrosion inhibitor of claim 1 wherein said monomeric chelating agent is selected from the group consisting of malonic acid, oxalic acid, maleic acid, malic acid, o-aminobenzoic acid, gallic acid, phthalic acid, oxamic acid, ammonium benzoate, catecol, ad pyrogallol and iminodiacetic acid.

5. The corrosion inhibitor of claim 1 wherein the film forming polymeric chelating agent is selected from the group consisting of polymers or co-polymers of o-di- or tri-hydroxyl, carboxy or sulfoxy aromatic compounds, poly o-di or tri-carboxylic acid styrenes and acrylic acids and maleic acid.

6. The corrosion inhibitor of claim 5 wherein said film forming polymeric chelating agent is a novolac.

7. The corrosion inhibitor of claim 5 wherein said film forming polymer chelating agent is a polyacrylic acid-co-maleic acid or polyacrylic acid or polymaleic acid.

8. The corrosion inhibitor of claim 1 which is neutralized with a sterically hindered amine or tetraalkyl ammonium hydroxide.

9. The corrosion inhibitor of claim 8 which is partially neutralized with an alkali metal hydroxide.

10. In a stripping, cleaning, lapping or abrasive slurry suspension composition, the improvement comprises about 1 to 10% by weight of the inhibitor of claim 1 in said composition.

11. In a stripping, cleaning, lapping, polishing or cutting slurry suspension composition for an iron or steel surface, the improvement which comprises including the corrosion inhibitor of claim 1.

12. An cleaning, lapping and slurry suspension composition consisting of;
   About 95-99.9% by weight of said cleaning, lapping and slurry suspension composition,
   About 0.1% to 5% by weight of a corrosion inhibitor comprising polyacrylic acid-co-maleic acid and malonic acid, or polyacrylic acid-co-maleic acid and oxalic acid being present.

13. The cleaning, lapping and slurry suspension composition of claim 12 including an oxygen scavenger.

14. A method of inhibiting corrosion on a metal surface in an aqueous medium by forming a 5, 6 or 7 membered chelation ring with the metal surface by treating the metal surface with the composition of claim 12.

15. The method of claim 14 wherein said composition includes an oxygen scavenger.

16. The method of claim 14 wherein said composition consists of a monomeric chelating agent selected from the group consisting of a multifunctional aromatic acid, multi-functional aromatic anhydride, multi-functional aliphatic acid, and multi-functional aliphatic anhydride, an aromatic o-amino carboxylic acid and an α or β-aliphatic amino carboxylic acid.

17. The method of claim 14 wherein said composition consists of a monomeric chelating agent selected from the group consisting of malonic acid, oxalic acid, maleic acid, malic acid, gallic acid, phthalic acid, catechol, 8-hydroxyquinoline, imino diacetic acid, ammonium benzoate and pyrogallol.

18. The method of claim 14 wherein the film forming polymeric chelating agent is selected from the group consisting of polymers or co-polymers of o-di or tri-hydroxyl, carboxy or sulfoxy aromatic compounds, poly o-di or tricarboxylic acid styrenes and acrylic acids and maleic acid.

* * * * *